(12) United States Patent
Lepoutre

(10) Patent No.: US 6,340,410 B1
(45) Date of Patent: *Jan. 22, 2002

(54) METHOD FOR DELIVERING A VARIABLE FLOW OF HYDROGEN PEROXIDE TO A BLEACHING VESSEL

(75) Inventor: Etienne Lepoutre, Saint-Germain-en-Laye (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,795
(22) PCT Filed: Mar. 17, 1997
(86) PCT No.: PCT/FR97/00473
§ 371 Date: Apr. 1, 1999
§ 102(e) Date: Apr. 1, 1999
(87) PCT Pub. No.: WO97/34828
PCT Pub. Date: Sep. 25, 1997

(30) Foreign Application Priority Data

Mar. 18, 1996 (FR) .............................. 96 03356

(51) Int. Cl.[7] .................................. D21C 9/16
(52) U.S. Cl. ................................ 162/62; 162/78; 8/111
(58) Field of Search ..................... 162/78, 17, 49, 162/52, 238, 61, 62; 8/111, 156

(56) References Cited

U.S. PATENT DOCUMENTS 4,878,998 A * 11/1989 Hook et al. .................... 162/49

FOREIGN PATENT DOCUMENTS

CA 2 098 062 A 12/1993
WO WO 93/21106 A 10/1993

OTHER PUBLICATIONS

Aitken et al, "Peroxides to Bleach Sulphate Pulp", Canadian Chemical Processing, pp. 42 and 44, Feb. 1953.*

* cited by examiner

Primary Examiner—Steve Alvo
(74) Attorney, Agent, or Firm—Pennie & Edmonds LLP

(57) ABSTRACT

A unit (4) consumes hydrogen peroxide at a predetermined concentration C1 and at a rate variable from 0 to D1. The apparatus (1) generates hydrogen peroxide at a concentration C2>C1 and at a rate variable between two values D2 and D3. The generated hydrogen peroxide is fed to a buffer (2) from which a variable flow is drawn, optionally diluted (at 3) and fed to the consumer unit (4). The system is useful for delivering hydrogen peroxide to paper pulp bleaching units.

13 Claims, 2 Drawing Sheets

METHOD FOR DELIVERING A VARIABLE FLOW OF HYDROGEN PEROXIDE TO A BLEACHING VESSEL

Figure 1:
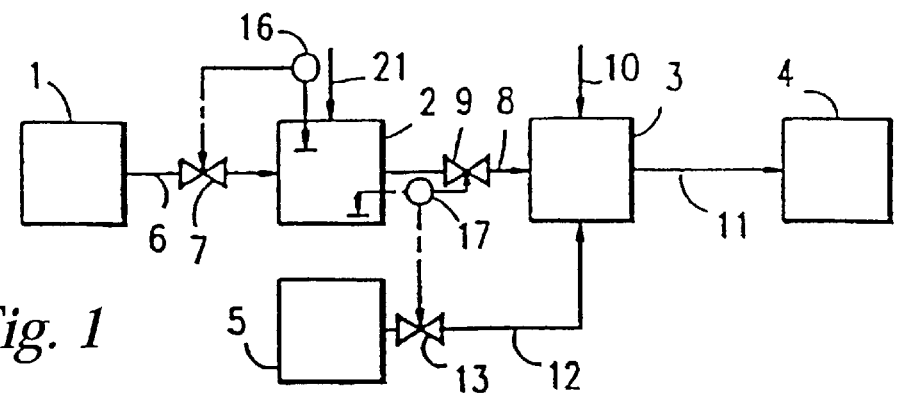

The present invention relates to delivering hydrogen peroxide at a variable rate to a consumer unit, in particular to a unit for bleaching paper pulp forming part of a plant for the production of paper pulp.

The hydrogen peroxide concentrations in question are concentrations by weight, in solution in water.

Provision has already been made to generate in situ the hydrogen peroxide consumed by a unit for bleaching paper pulp, this peroxide being conveyed directly by pipe from the generation apparatus to a bleaching unit.

However, this technique frequently presents the following problem: the bleaching unit requires a hydrogen peroxide rate which varies within a range considerably greater than the flexibility of the generation apparatus.

The rates in question here are rates reduced to the 100% concentration of hydrogen peroxide.

The aim of the invention is to overcome this difficulty. To this end, the subject-matter of the invention is a method for supplying hydrogen peroxide having a predetermined concentration $C1$ to a unit which consumes hydrogen peroxide at a variable rate R, in particular a unit for bleaching paper pulp, characterized in that:

hydrogen peroxide having a concentration $C2$ greater than or equal to the value $C1$ is generated on the site of the consumer unit or in the immediate proximity of this site;

the hydrogen peroxide thus generated is temporarily stored in at least one holding tank; and hydrogen peroxide is drawn from the holding tank at a variable rate which, optionally after dilution, corresponds to the said rate R and is fed to the consumer unit.

The method according to the invention can comprise one or more of the following characteristics:

in the event of the liquid level in the holding tank falling to a predetermined low level, hydrogen peroxide having in particular a concentration $C3$ markedly greater than the value $C1$ is drawn from a back-up tank, is optionally diluted with water to the concentration $C1$ and is fed to the consumer unit;

for supplying a consumer unit which accepts hydrogen peroxide having a concentration $C3$ markedly greater than the value $C1$, in the event of the liquid level in the holding tank falling to a predetermined low level, hydrogen peroxide having the concentration $C3$ is drawn from a back-up tank and is fed to the consumer unit;

the rate consumed R varies from 0 to a value $R1$ and the rate generated varies between two values $R2$ and $R3$ such that $R3-R2<R1$;

the values $R2$ and $R3$ respectively represent 50 and 110% approximately of a nominal hydrogen peroxide generation rate NR, whereas the value $R1$ represents approximately 400% of this NR value;

the value $C2$ is between 2 and 45% approximately and in particular between 15 and 30% approximately, whereas the value $C3$, when a back-up tank is used, is between 45 and 80% approximately.

Another subject-matter of the invention is a plant intended for the implementation of a method as defined above, this plant comprising:

an apparatus for the generation of hydrogen peroxide at a concentration $C2$;

at least one holding tank connected via a pipe to the generation apparatus; and a unit which consumes hydrogen peroxide at a variable rate R, connected via a pipe to the holding tank.

According to other characteristics of this plant:

the plant additionally comprises a back-up tank which contains hydrogen peroxide at a concentration $C3$ which is in particular markedly greater than the concentration $C1$ of the hydrogen peroxide consumed by the consumer unit and which is connected to the latter via another pipe;

the plant additionally comprises a dilution apparatus inserted between the back-up tank and the consumer unit;

the dilution apparatus is also inserted between the generation apparatus and the consumer unit.

Figure 5:
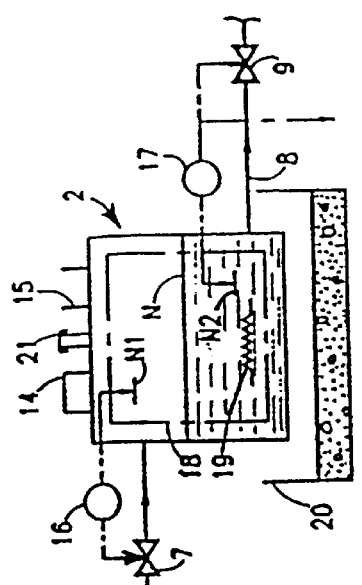

Implementational examples of the invention will now be described with regard to the appended drawings, in which:

FIGS. 1 to 4 diagrammatically represent three alternative forms of the plant according to the invention;

FIG. 5 diagrammatically represents the holding tank; and

Figure 6:
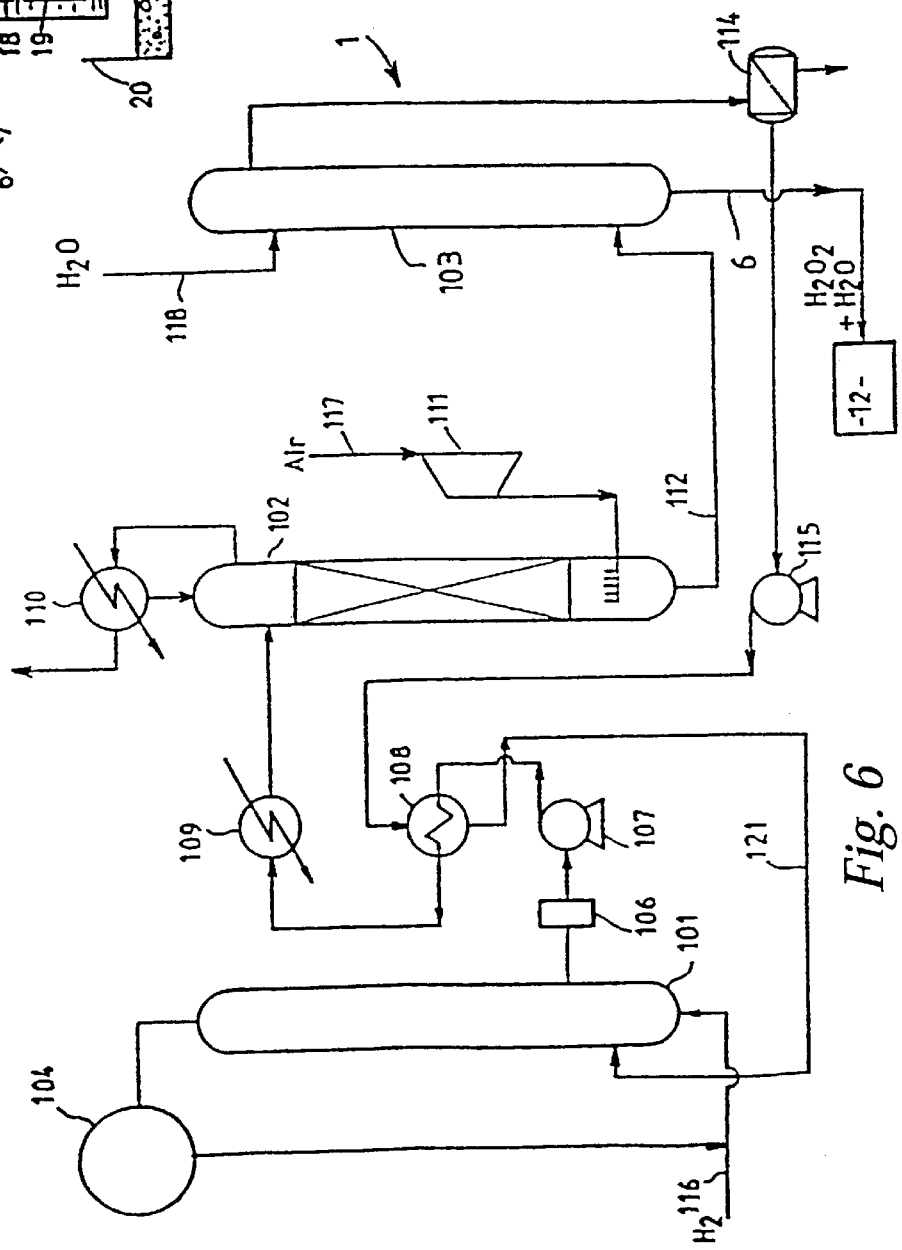

FIG. 6 diagrammatically represents the apparatus for generation of hydrogen peroxide.

The plant diagrammatically represented in FIG. 1 essentially comprises an apparatus 1 for generation of hydrogen peroxide, a holding tank 2, a dilution apparatus 3, a unit 4 for bleaching paper pulp which forms part of a plant for the production of paper pulp, and a back-up tank 5.

The unit 4 consumes a highly variable rate R, of between 0 and a value $R1$, of hydrogen peroxide having a predetermined concentration $C1$, whereas the apparatus 1 generates hydrogen peroxide at a concentration $C2>C1$ but with a rate which can vary between two values $R2$ and $R3$ such that $R3-R2$ is much less than $R1$.

By way of numerical example, $R1=4NR$, where NR is the nominal generation rate of the apparatus 1, $R2=0.6NR$, $R3=1.1NR$, NR can be between 230 and 2300 kg/h, and $C2$ is normally between 2 and 45% and generally between 15 and 30%.

The generation outlet of the apparatus 1 is connected to the inlet of the holding tank via a pipe 6 equipped with a valve 7. The outlet of the holding tank is connected to the inlet of the apparatus 3 via a pipe 8 equipped with a valve 9, the apparatus 3 also being supplied with demineralized water via a pipe 10. The outlet of the apparatus 3 is connected to the unit 4 via a pipe 11. The tank 5 is connected via a pipe 12 equipped with a valve 13 to the apparatus 3.

The holding tank 2 (FIG. 5) is a tank made of stainless steel, of polyethylene or of aluminium equipped at its top with a manhole 14 and with a vent 15 equipped with a filter. It comprises, internally, a high level detector 16 and a low level detector 17. The detector 16 is set up to close the valve 7 when the high level is reached and the detector 17 is set up to close the valve 9 and to open the valve 13 when the low level is reached.

In normal operation, the level N of the liquid in the holding tank is between $N1$ and $N2$, so that the valves 7 and 9 are open whereas the valve 13 is closed. The tank 5 contains "commercial" hydrogen peroxide, that is to say hydrogen peroxide generated at a distance from the site of the plant and delivered by tankers, generally by road tankers. The commercial hydrogen peroxide generally has a concentration of between 45 and 80% and often of the order of 70%.

Thus, the rate R required at each moment by the unit 4 is drawn from the holding tank 2, taking into account the dilution in 3 necessary to bring it to the concentration $C1$.

Simultaneously, the peroxide generated by the apparatus 1 arrives directly at the holding tank 2 at the concentration C2 and at a rate of between R2 and R3.

If the rate drawn from the holding tank is between R2 and R3, the apparatus 1 conforms to the variations in the rate required by the unit 4, in order to keep the level N at a substantially constant value and optionally, by virtue of greater variations in the generation rate, in order to re-establish a predetermined mean level in the holding tank. The volume of the latter is calculated in order to allow the variations in the rate consumed, taking into account the characteristics of the unit 4, to be continuously conformed to.

If, nevertheless, the rate consumed causes an excessive withdrawal of hydrogen peroxide from the holding tank, when the level N reaches the low level N2, the detector 17, optionally after having closed the valve 9, opens the valve 13. This makes it possible for the level N to become stabilized or to rise and the hydrogen peroxide consumed is at least partly drawn from the tank 5, after dilution in 3. Of course, the rate of water introduced into the apparatus 3 is then increased in order to re-establish at the outlet, in the pipe 11, the desired concentration C1.

If, in contrast, the rate consumed falls to such an extent that the level N rises to the high level N1, the detector 16 closes the valve 7 and, if these conditions persist, it may then be necessary to shut down the generation apparatus 1.

Preferably, the volume of the tank 5 will be determined so that it makes it possible to supply the unit 4 during the shutdown and maintenance phases of the generation apparatus 1.

Figure 2:
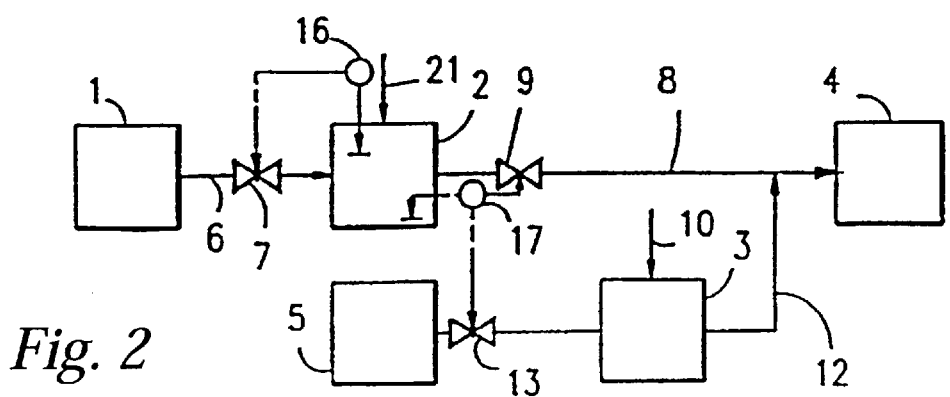

The plant represented in FIG. 2 only differs from that in FIG. 1 in that the apparatus 1 generates hydrogen peroxide at the concentration Cl. Consequently, the dilution apparatus 3 is positioned solely on the pipe 12 and is only involved when, following an excessive fall in the level N, the back-up tank 5 is brought into use.

Figure 3:
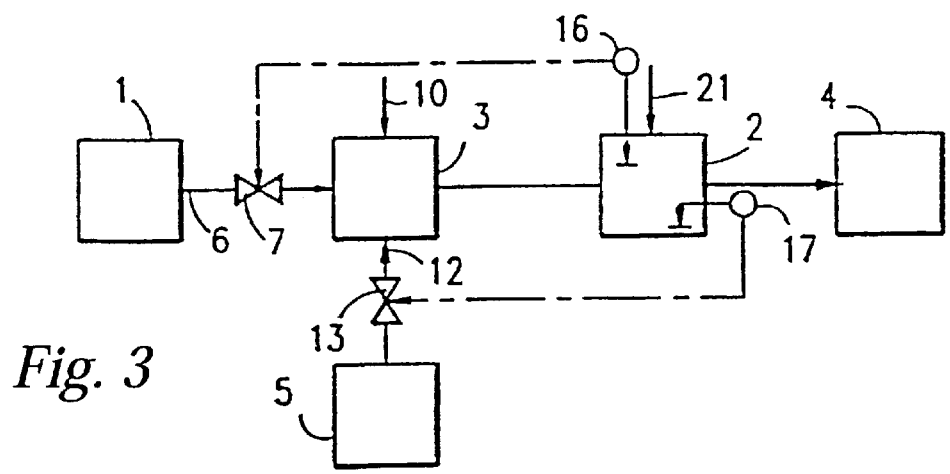

The plant in FIG. 3 only differs from that in FIG. 1 in that the dilution apparatus 3 is positioned on the pipe 6, between the valve 7 and the holding tank 2. The pilot-operated valve 9, which is no longer necessary, has been removed, so that the level detector 17 only controls the valve 13.

Figure 4:
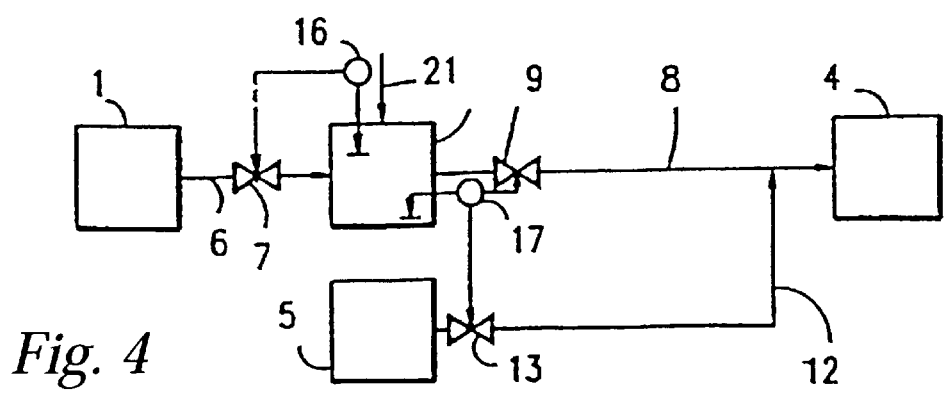

The plant in FIG. 4 only differs from that in FIG. 2 by the removal of the dilution apparatus 3. This corresponds to the case where the unit 4 can consume hydrogen peroxide either at the concentration C1 of the generation apparatus or at the concentration C3 of the commercial peroxide contained in the back-up tank 5.

As represented in dot-and-dash lines in FIG. 5, the holding tank 2 can be equipped with thermal insulation 18 and/or with reheating means 19, in order to avoid any risk of crystallization during cold weather. Moreover, the holding tank is preferably positioned above a retaining pit 20 suitable for collecting possible hydrogen peroxide leaks.

In each embodiment of the invention, the holding tank comprises means 21 for injection into the holding tank (or, as an alternative form, into the dilution apparatus 3) of a stabilizer of known type, for example chosen from carboxylic, aminomethylenecarboxylic, phosphonic and aminomethylenephosphonic compounds, in particular ethylenediaminetetraacetic acid (EDTA) or its salts, diethylentriaminepentaacetic acid (DTPA) or its salts, polyacrylic acids, diethylenetriaminepentamethylene-phosphonic acid or its salts, 1,2-diamino-N,N,N',N'-tetramethylenephosphonic acid or its salts, or hydroxyethylbismethylenephosphonic acid or its salts.

The stabilizer makes it possible to prevent the decomposition of the hydrogen peroxide at relatively low concentration until this hydrogen peroxide is injected into the unit 4.

As an alternative form, the plant according to the invention can comprise several holding tanks 2.

The hydrogen peroxide generation apparatus 1 is preferably of the type employing a process for the auto-oxidation of anthraquinone derivatives which is well known in the art. An apparatus of this type is represented diagrammatically in FIG. 6.

The apparatus in FIG. 6 comprises three main apparatuses in the form of columns: a catalytic hydrogenator 101, a countercurrent oxidizer 102 and a water extractor 103. It also comprises numerous items of equipment associated with these three apparatuses, only some of which have been represented: a booster-condenser unit 104 for recirculating the gaseous mixture containing hydrogen, associated with the hydrogenator; a filter 106, a pump 107, a heat exchanger 108, a water condenser 109, a top condenser 110 and an air compressor 111, associated with the oxidizer; a pipe 112, as short as possible, connecting the base of the oxidizer 102 to that of the extractor 103; and a coalescer 114 and a pump 115 for recycling the working solution.

A pipe 116 for supplying the hydrogenator with make-up hydrogen, a pipe 117 for supplying the compressor 111 with air, a pipe 118 for supplying the extractor 103 with demineralized water, the pipe 6 for generating hydrogen peroxide, which leaves from the base of the extractor 103, and a pipe 121 for recycling the working solution have also been represented in FIG. 6.

The hydrogen peroxide generation apparatus comprises many other items of equipment well known in the art and which have not been represented, such as means for regenerating decomposed products of the working solution, for making use of the catalyst, for recovering solvent, and the like.

In operation, the working solution, composed of at least one anthraquinone derivative and of at least one organic solvent, is introduced at the base of the hydrogenator 101 via the recycling pipe 121 connected to the delivery of the pump 115, and a gas stream containing hydrogen is also introduced at the base of the hydrogenator. This gas stream is composed, on the one hand, of the gas stream drawn off at the top of the hydrogenator and recirculated by the booster-condenser unit 104 and, on the other hand, of make-up hydrogen arriving via the pipe 116.

The working solution is thus partially reduced. The reduced solution, drawn from the base of the hydrogenator by the pump 107 via the filter 106, thus comprises hydroquinone derivatives (for example 80% of tetrahydroanthrahydroquinone and 20% of anthrahydroquinone).

The anthraquinone derivative constituting the working solution is preferably chosen from 2-alkyl-9,10-anthraquinones in which the alkyl substituent comprises from 1 to 5 carbon atoms, such as the methyl, ethyl, sec-butyl, tert-butyl or tert-amyl radicals, and the corresponding 5,6,7,8-tetrahydro derivatives, or from dialkyl-9,10-anthraquinones in which the alkyl substituents, which are identical or different, comprise from 1 to 5 carbon atoms, such as the methyl, ethyl or tert-butyl radicals, for example 1,3-dimethyl, 1,4-dimethyl, 2,3-dimethyl, 2,7-dimethyl, 1,3-diethyl, 2,7-di-tert-butyl or 2-ethyl-6-tert-butyl, and the corresponding 5,6,7,8-tetrahydro derivatives. The organic solvent constituting the working solution is preferably a mixture of a nonpolar compound and of a polar compound. The nonpolar compound is preferably chosen from petroleum fractions with a boiling point greater than 140° C. mainly comprising aromatic hydrocarbons comprising at least 9 carbon atoms, such as trimethylbenzene isomers, tetramethylbenzene isomers, tert-butylbenzene, methylnaphthalene isomers or dimethylnaphthalene isomers. The polar compound is preferably chosen from saturated alcohols preferably comprising from 7 to 11 carbon atoms, such as diisobutylcarbinol, 3,5,5-trimethylhexanol, isoheptanol, carboxylic acid esters such as the methylcyclohexyl acetate sold under the name of "Sextate", heptyl acetate, butyl benzoate or ethyl heptanoate, phosphoric acid esters, such as tributyl phosphate, tri(2-ethylbutyl) phosphate, tri(2-ethylhexyl) phosphate or tri(n-octyl) phosphate, or tetrasubstituted ureas, such as tetra(n-butyl)urea.

"Hydrogen peroxide equivalent" will be understood below as meaning the amount of hydrogen peroxide, expressed in grams, which one litre of working solution is capable of supplying on conclusion of the oxidation stage if the yield of this stage in the oxidizer 102 is 100%. This potential concentration by mass of peroxide corresponds to a molar concentration which is equal to the molar concentration of all the reoxidizable anthrahydroquinone forms in the working solution. It depends, on the one hand, on the concentration of anthraquinone forms in the starting working solution and, on the other hand, on the hydrogenation conditions in 101.

In the present case, the hydrogenation is carried out at a temperature of between 50 and 70° C., with a pressure in the gas headspace of the hydrogenator (pressure which controls the hydrogen rate) of 0.8 to 1.5 bar approximately, and the hydrogen peroxide equivalent is adjusted to a value of between 7 and 9 g/l approximately, by adjusting the residence time in the hydrogenator, for a given concentration of anthraquinone forms.

The reduced working solution drawn from the hydrogenator is filtered in 106 to remove any trace of catalyst and then cooled in 108 and then in 109 to a temperature of the order of 35 to 40° C. The pressure of the gas headspace in the oxidizer is maintained at a value of between 2 and 4 bar. The reduced working solution is thus oxidized in 102, the top fluid from the oxidizer being partially condensed in 110.

The hydrogen peroxide formed by the oxidation reaction is drawn from the base of the oxidizer, in an amount equal to the product of the abovementioned hydrogen peroxide equivalent and the yield from the oxidizer, as a mixture with the reoxidized working solution. This liquid is fed directly via the pipe 112, by virtue of the propelling pressure difference, to the base of the extractor 103, which operates slightly above atmospheric pressure. A liquid-liquid extraction is carried out in the extractor by means of the demineralized water introduced at the top of the extractor.

A water-hydrogen peroxide solution is drawn from the base of the latter, the hydrogen peroxide concentration of which is adjusted to the value necessary for its direct use in the bleaching unit 4.

The working solution separated from the hydrogen peroxide is drawn from the top of the extractor 103, freed from the droplets of aqueous phase which it has entrained in the coalescer 114 and then fed via the pump 115 to the heat exchanger 108, in which it is reheated and, from there, recycled to the base of the hydrogenator 101.

The oxidizer 102 comprises an external casing comprising an organized packing, or simple perforated trays or trays of the distillation tray type, that is to say each with a liquid seal, orifices for bubbling the gas rising through this seal and downcomer means for the liquid from one tray to the next, or else a combination of an organized packing and of such trays.

What is claimed is:

1. Method for supplying hydrogen peroxide having a predetermined concentration to a bleaching vessel which consumes hydrogen peroxide at a variable rate which comprises:

generating hydrogen peroxide having a concentration, which is greater than or equal to the predetermined supplying concentration, on the site of the bleaching vessel or in the immediate proximity of this site wherein a generation rate varies from a minimum generation rate and a maximum generation rate;

temporarily storing the hydrogen peroxide thus generated in at least one holding tank; and drawing the hydrogen peroxide from the holding tank and, when the generating concentration of said hydrogen peroxide is greater than the predetermined supplying concentration, diluting said hydrogen peroxide with water to the predetermined supplying concentration, the drawing of said hydrogen peroxide being carried out at a variable rate which corresponds to said variable consuming rate, and feeding said hydrogen peroxide to the bleaching vessel wherein the consuming rate varies from a number greater than 0 to a maximum consuming rate, and the difference between the minimum and maximum generation rates is smaller than the maximum consuming rate and, wherein the liquid level in the holding tank varies between a highest level and a predetermined low level, and as soon as the liquid level in the holding tank in the holding tank becomes the predetermined low level, hydrogen peroxide having a concentration equal to or greater than the predetermined supplying concentration is drawn from a back-up tank and diluted with water to the predetermined supplying concentration when the back-up tank concentration is greater than the predetermined supplying concentration, and fed to the bleaching vessel.

2. Method according to claim 1, characterized in that the minimum generation rate and the maximum generation rate respectively represent 50 and 110% approximately of a nominal hydrogen peroxide generation rate, whereas the maximum consuming rate is approximately 400% of the nominal hydrogen peroxide generation rate.

3. Method according to claim 1, characterized in that the generating concentration is between 2 and 45% approximately, whereas the back-up tank concentration is between 45 and 80% approximately.

4. Method according to claim 3, wherein the generating concentration is between 15 and 30% approximately.

5. Method according to claim 1, wherein the back-up tank concentration is between 45 and 80%.

6. Method for supplying hydrogen peroxide having a predetermined concentration to a bleaching vessel which consumes hydrogen peroxide at a variable rate which comprises:

generating hydrogen peroxide having a concentration, which is greater than or equal to the predetermined supplying concentration, on the site of the bleaching vessel or in the immediate proximity of this site wherein a generation rate varies from a minimum generation rate and a maximum generation rate;

temporarily storing the hydrogen peroxide thus generated in at least one holding tank; and drawing the hydrogen peroxide from the holding tank and, when the generating concentration of said hydrogen peroxide is greater than the predetermined supplying concentration, diluting said hydrogen peroxide with water to the predetermined supplying concentration, the drawing of said hydrogen peroxide being carried out at a variable rate which corresponds to said variable consuming rate, and feeding said hydrogen peroxide to the bleaching vessel wherein the consuming rate varies from a number greater than 0 to a maximum consuming rate, and the difference between the minimum and maximum generation rates is smaller than the maximum consuming rate and, wherein the liquid level in the holding tank varies between a highest level and a predetermined low level, and as soon as the liquid level in the holding tank in the holding tank becomes the predetermined low level, hydrogen peroxide having a concentration equal to or greater than the predetermined supplying concentration is drawn from a back-up tank and is fed to the bleaching vessel.

7. Method according to claim 6, characterized in that the minimum gerieration rate and the maximum generation rate respectively represent 50 and 110% approximately of a nominal hydrogen peroxide generation rate, whereas the maximum consuming rate is approximately 400% of the nominal hydrogen peroxide generation rate.

8. Method according to claim 6, characterized in that the generating concentration is between 2 and 45% approximately, whereas the back-up tank concentration is between 45 and 80% approximately.

9. Method according to claim 6, wherein the back-up tank concentration is between 45 and 80%.

10. Method for supplying hydrogen peroxide having a predetermined concentration to a bleaching vessel which consumes hydrogen peroxide at a variable rate which comprises:

generating hydrogen peroxide having a concentration, which is greater than or equal to the predetermined supplying concentration, on the site of the bleaching vessel or in the immediate proximity of this site wherein a generation rate varies from a minimum generation rate and a maximum generation rate;

temporarily storing the hydrogen peroxide thus generated in at least one holding tank; and drawing the hydrogen peroxide from the holding tank and, when the generating concentration of said hydrogen peroxide is greater than the predetermined supplying concentration, diluting said hydrogen peroxide with water to the predetermined supplying concentration, the drawing of said hydrogen peroxide being carried out at a variable rate which corresponds to said variable consuming rate, and feeding said hydrogen peroxide to the bleaching vessel wherein the consuming rate varies from a number greater than 0 to a maximum consuming rate, and the difference between the minimum and maximum generation rates is smaller than the maximum consuming rate and, wherein the liquid level in the holding tank varies between a highest level and a predetermined low level, and as soon as the liquid level in the holding tank in the holding tank becomes the predetermined low level, hydrogen peroxide having a concentration equal to or greater than the predetermined supplying concentration is drawn from a back-up tank and diluted with water to the predetermined supplying concentration when the back-up tank concentration is greater than the predetermined supplying concentration, and fed to the holding tank.

11. Method according to claim 10, characterized in that the minimum generation rate and the maximum generation rate respectively represent 50 and 110% approximately of a nominal hydrogen peroxide generation rate, whereas the maximum consuming rate is approximately 400% of the nominal hydrogen peroxide generation rate.

12. Method according to claim 10, characterized in that the generating concentration is between 2 and 45% approximately, whereas the back-up tank concentration is between 45 and 80% approximately.

13. Method according to claim 10, wherein the back-up tank concentration is between 45 and 80%.

* * * * *